United States Patent
Stanzel et al.

(10) Patent No.: US 11,331,741 B2
(45) Date of Patent: May 17, 2022

(54) SYSTEM AND DEVICE OPERATING USING A WELDING POWER BUS

(71) Applicant: ILLINOIS TOOL WORKS INC., Glenview, IL (US)

(72) Inventors: David Austin Stanzel, Appleton, WI (US); Michael William Roth, Greenville, WI (US); Anthony VanBergen Salsich, Appleton, WI (US); Jeffrey Robert Thomas, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/713,102

(22) Filed: Sep. 22, 2017

(65) Prior Publication Data

US 2018/0009053 A1 Jan. 11, 2018

Related U.S. Application Data

(62) Division of application No. 13/212,942, filed on Aug. 18, 2011, now Pat. No. 9,789,558.

(51) Int. Cl.
*B23K 9/10* (2006.01)
(52) U.S. Cl.
CPC .................. *B23K 9/1006* (2013.01)
(58) Field of Classification Search
CPC ...... B23K 9/10; B23K 9/1006; B23K 9/1068; B23K 9/1095; B23K 9/09; B23K 9/095; B23K 9/0955
USPC ........ 219/137.7, 136, 130.1, 130.21, 137 PS
See application file for complete search history.

(56) References Cited

U.S. PATENT DOCUMENTS

| 4,839,499 A | 6/1989 | Kotecki |
| 5,086,208 A * | 2/1992 | Habermann ......... B23K 9/1333 219/130.1 |
| 5,208,436 A | 5/1993 | Blankenship |
| 5,446,255 A | 8/1995 | Blondy |

(Continued)

FOREIGN PATENT DOCUMENTS

| AT | 397446 B | 4/1994 |
| CN | 1553839 | 12/2004 |

(Continued)

OTHER PUBLICATIONS

International Search Report from PCT application No. PCT/US2012/051272 dated Dec. 3, 2012, 11 pgs.

(Continued)

*Primary Examiner* — Helena Kosanovic
*Assistant Examiner* — Ayub A Maye
(74) *Attorney, Agent, or Firm* — McAndrews, Held & Malloy, Ltd.

(57) ABSTRACT

A system and device operating using a welding power bus are provided. One welding power supply includes control circuitry configured to control the operation of the welding power supply and power conversion circuitry configured to convert input power to output welding power. The welding power supply also includes welding terminals configured to receive the output welding power from the power conversion circuitry and to provide the output welding power to a device that does not use the welding power for a welding operation. The control circuitry is configured to adapt the output welding power to the device.

17 Claims, 7 Drawing Sheets

(56) References Cited

U.S. PATENT DOCUMENTS

| | | | |
|---|---|---|---|
| 6,627,849 B2 | 9/2003 | Ihde | |
| 6,818,860 B1* | 11/2004 | Stava | B23K 9/1006 219/130.1 |
| 7,180,029 B2 | 2/2007 | Ott | |
| 7,205,503 B2 | 4/2007 | Reynolds | |
| 7,211,764 B2 | 5/2007 | Leisner | |
| 8,288,686 B2 | 10/2012 | Kaufman | |
| 8,405,001 B2 | 3/2013 | Albrecht | |
| 8,426,772 B2* | 4/2013 | Luo | B23K 9/1056 219/130.21 |
| 2006/0027546 A1 | 2/2006 | Reynolds | |
| 2006/0061921 A1 | 3/2006 | Chen | |
| 2006/0138113 A1* | 6/2006 | Ott | B23K 9/1087 219/132 |
| 2006/0157459 A1* | 7/2006 | Fosbinder | B23K 9/1006 219/130.21 |
| 2006/0214510 A1 | 9/2006 | Patel | |
| 2007/0051711 A1 | 3/2007 | Kachline | |
| 2007/0080154 A1 | 4/2007 | Ott | |
| 2008/0087653 A1* | 4/2008 | Furman | B23K 9/10 219/130.21 |
| 2008/0112202 A1 | 5/2008 | Hu | |
| 2008/0203065 A1 | 8/2008 | Feldhausen | |
| 2008/0264922 A1 | 10/2008 | Fosbinder | |
| 2009/0039064 A1* | 2/2009 | Enyedy | B23K 9/1006 219/132 |
| 2010/0194356 A1 | 8/2010 | Fosbinder | |
| 2010/0320183 A1 | 12/2010 | Borchert | |
| 2011/0006046 A1 | 1/2011 | Albrecht | |
| 2011/0073569 A1 | 3/2011 | Rappl | |
| 2011/0114607 A1 | 5/2011 | Albrecht | |

FOREIGN PATENT DOCUMENTS

| | | |
|---|---|---|
| CN | 101778688 | 7/2010 |
| EP | 1138429 | 10/2001 |
| EP | 1612909 | 1/2006 |
| WO | 0041835 | 7/2000 |
| WO | 2008031052 | 3/2008 |
| WO | 2008063736 | 5/2008 |
| WO | 2009009241 | 1/2009 |
| WO | 2009019585 | 2/2009 |
| WO | 2010083017 | 7/2010 |

OTHER PUBLICATIONS

Carcelle, Xavier, Power Line Communications in Practice, ISBN 13:978-1-59693-335-4, 2006, (4 pgs).

Opposition, EP Appln No. 2744620, dated Aug. 16, 2018 (57 pgs).

Decision revoking EP Appln No. 12753311.5, dated Jan. 10, 2022.

Minutes of the oral proceedings EP Appln No. 12753311.5, dated Jan. 10, 2022.

* cited by examiner

SYSTEM AND DEVICE OPERATING USING A WELDING POWER BUS

CROSS REFERENCE TO RELATED APPLICATION

This application is a Divisional of U.S. patent application Ser. No. 13/212,942, entitled "SYSTEM AND DEVICE OPERATING USING A WELDING POWER BUS", filed on Aug. 18, 2011, which is herein incorporated by reference in its entirety for all purposes.

BACKGROUND

The invention relates generally to welding systems, and, more particularly, to a system and device operating using a welding power bus.

Welding systems support a variety of processes, such as metal inert gas (MIG) welding, tungsten inert gas (TIG) welding, stick welding, and so forth, which may operate in different modes, such as constant current or constant voltage. Certain welding applications, such as boiler servicing and repair, shipyard work, construction, and so forth, may position a welding location or workpiece large distances from a welding power source. The power source provides conditioned power for the welding application, and the welder must pull and monitor a long welding power cable extending from the power source to the welding location.

In such applications, changing welding processes and settings traditionally requires a manual adjustment to a knob, switch or operator interface on, or proximate to, the welding power source, and even connection of entirely different welding cables or components to the source, particularly when the welder uses stick or MIG processes for some of the work, and a TIG process for other work. Furthermore, the welding operator often uses auxiliary devices, such as lights and electric grinders, at the location of the weld. However, the auxiliary outlets that support such devices are sometimes located on the power supply. Accordingly, with auxiliary outlets on or proximate to the welding power source, the user may have to stop welding and return to the power source to plug in the auxiliary devices. In many applications, this may entail walking back considerable distances, through sometimes complex and intricate work environments. In many cases, such auxiliary outlets are simply unavailable on the power supply, and separate extension cords or cables must be run for the auxiliary devices to be powered.

Accordingly, there exists a need for systems and devices for providing more convenient power and control functionalities in welding systems, particularly in environments where the welding operation is carried out at a considerable distance from the welding power source.

BRIEF DESCRIPTION

In an exemplary embodiment, a welding power supply includes control circuitry configured to control the operation of the welding power supply and power conversion circuitry configured to convert input power to output welding power. The welding power supply also includes welding terminals configured to receive the output welding power from the power conversion circuitry and to provide the output welding power to a device that does not use the welding power for a welding operation. The control circuitry is configured to adapt the output welding power to the device.

In another embodiment, a method includes converting input power received by a welding power supply to output welding power and adapting the output welding power for use by a device that does not use the output welding power for a welding operation. The method also includes providing the adapted output welding power to the device.

In another embodiment, a welding system includes a welding torch configured to receive welding power from a welding power supply. The welding torch is configured to receive power from welding terminals of the welding power supply. The welding system also includes a non-welding device configured to receive welding power from the welding terminals of the welding power supply. The welding power supply is configured to adapt the welding power to power the non-welding device when the non-welding device is being used and to adapt the welding power supply to power the welding torch when the welding torch is being used.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
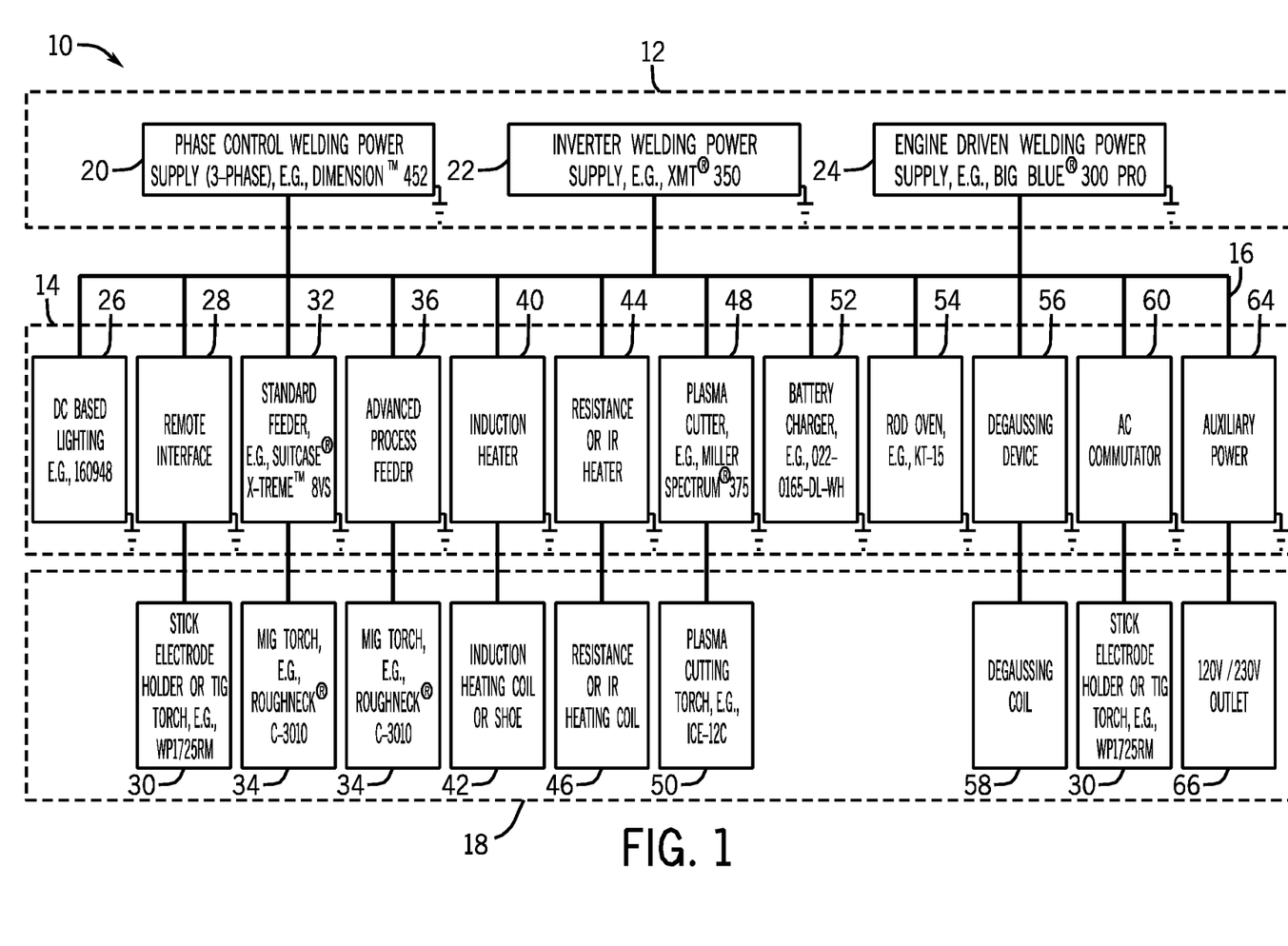
FIG. 1 is a schematic diagram of an embodiment of a welding system employing a welding power bus in the form of a welding cable coupled to a welding power supply.

FIG. 1 is a schematic diagram of a welding system 10 that uses a welding power bus. The welding system 10 includes a welding power supply 12 electrically and communicatively connected to one or more devices 14 via a cable system 16. Further, the one or more devices 14 may be coupled to a secondary device 18. The welding power supply 12 may be one of various different types of power supplies. In certain embodiments, the welding power supply 12 may be a phase control welding power supply 20 (i.e., a 3-phase power supply). For example, the phase control welding power supply 20 may be a Dimension™ 452 manufactured by Miller Electric Mfg. Co. of Appleton, Wis. In other embodiments, the welding power supply 12 may be an inverter welding power supply 22. For instance, the inverter welding power supply 22 may be an XMT® 350 manufactured by Miller Electric Mfg. Co. of Appleton, Wis. Further, in some embodiments, the welding power supply 12 may be an engine-driven welding power supply 24. For example, the engine-driven welding power supply 24 may be a Big Blue® 300 Pro manufactured by Miller Electric Mfg. Co. of Appleton, Wis.

It should be appreciated that the welding power supply 12 may be any one of the welding power supplies 20, 22, 24, or the welding power supply 12 may be another welding power supply. Further, the welding power supply 12 provides a welding power (such as in the form of direct current (DC) power) in order to power devices 14 connected to a welding power bus. The cable assembly 16 represents the cabling for the welding power bus. In certain embodiments, the welding power supply 12 communicates with the devices 14 using the cable assembly 16. For example, the welding power supply 12 may communicate with the devices 14 using the same cable that supplies power, such as by using weld cable communication (WCC). In some embodiments, the cable assembly 16 may use two separate cables connected to the welding power supply 12, a first cable for supplying power and a second cable for data communication.

The devices 14 use power directly from the welding power supply 12 to operate. Therefore, each of the devices 14 that is connected, or connectable, to the welding power supply 12 via the cable assembly 16 is configured to operate using the power provided by the welding power supply 12, which power may be adapted for particular devices, as discussed below. As may be appreciated, the devices 14 may be configured to operate at parameters (e.g., voltages, currents, etc.) that vary from one device to another. Therefore, the welding power supply 12 is configured to adapt the power output to the particular device or devices 14 that are connected to the welding power supply 12. In certain embodiments, the welding output voltage may generally be between approximately 60 and 70 VDC. As will be appreciated by those skilled in the art, heretofore known welding systems have always utilized welding output and welding connections to provide power (typically current and/or voltage controlled) to a weld cable designed to be coupled only between the welding power supply and a welding component (e.g., a wire feeder, a welding torch, a welding pendant, etc.). The system described in the present disclosure allows the same connections and weld cable to be utilized effectively as a "power bus" to provide power to any one or more of a range of devices that do not carry welding current for a welding operation (although some of the devices may).

The specific devices 14 illustrated are meant to be examples of devices that may operate using the welding power directly from the welding power supply 12. However, there are many other devices that may be configured to operate using the welding power. Further, as may be appreciated, the devices 14 may need to be adapted to operate using the power. As such, any electrical device that is properly adapted to use the power may be used with the welding system 10. Thus, welding operators may use powered devices 14 by directly connecting the devices 14 to the weld cable assembly 16. It is contemplated, for example, that various devices (some of which may carry current for welding) may be on-hand and needed for the work being performed at or near a welding location. The operator or assistant may, then, perform welding operations when needed as always, but then disconnect a welding component from the weld cable, and connect a different device to the cable without the need for different or separate cabling, and still utilizing the control and power conversion capabilities of the power supply.

In certain embodiments, lighting 26 may be powered by power from the welding power supply 12. For example, the lighting may be DC based lighting, such as lighting available under product number 160948 manufactured by Northern Tool+Equipment of Burnsville, Minn. that is modified (or adapted) to operate using the power. Moreover, the power conversion circuitry of the power supply may be adapted (i.e., controlled by the control circuitry of the power supply) to adapt the output power to the requirements of the lighting. Another of the devices 14 may be a remote interface 28 that functions as an interface module for a stick electrode holder or TIG torch 30. The stick electrode holder or TIG torch 30 may be any suitable stick electrode holder or torch. For example, the TIG torch 30 may be product number WP1725RM manufactured by Weldcraft of Appleton, Wis.

A standard wire feeder 32 may be another device 14 that may be adapted to operate using the welding power. For example, the wire feeder 32 may be product number Suitcase® X-TREME™ 8VS manufactured by Miller Electric Mfg. Co. of Appleton, Wis. A MIG torch 34 may be coupled to the wire feeder 32 for performing a welding operation. The MIG torch 34 may be any suitable MIG torch, such as a Roughneck® C-3010 manufactured by Miller Electric Mfg. Co. of Appleton, Wis.

Another one of the devices 14 may be an advanced process feeder 36 that incorporates a wire feeder with additional capabilities for pulsed welding operations and uses the MIG torch 34. An induction heater 40 may also be modified to operate using the welding power. The induction heater 40 is coupled to an induction heating coil or shoe 42 to create heat. Furthermore, a resistance or infrared heater 44 coupled to a resistance or infrared heating coil 46 may be adapted to operate using the welding power and may be used to generate heat. In some embodiments, a plasma cutter 48 may be powered by welding power from the welding power supply 12. For example, the plasma cutter 48 may be a Miller Spectrum® 375 manufactured by Miller Electric Mfg. Co. of Appleton, Wis. The plasma cutter 48 uses a plasma cutting torch 50, such as an ICE-12C manufactured by Miller Electric Mfg. Co. of Appleton, Wis.

A battery charger 52 is another device 14 that may be adapted to operate using the welding power. For example, the battery charger 52 may be product number 022-0165-DL-WH manufactured by Deltran Corporation of Deland, Fla. that is adapted to operate using the welding power. Further, one of the devices 14 may be a rod oven 54 for heating welding electrodes. In certain embodiments, the rod oven 54 may be product number KT-15 manufactured by Henkel Enterprises, LLC of Hammond, La.

In addition, another device 14 is a degaussing device 56 that may be coupled to a degaussing coil 58 for decreasing unwanted magnetic fields. As may be appreciated, certain welding processes may use an AC commutator 60 that may receive welding power to operate. The stick electrode holder or TIG torch 30 is coupled to the commutator 60 during operation. To power other non-adapted devices, an auxiliary power device 64 may be used to convert welding power to an AC voltage that can be used by any AC device by providing a 120/230 volt outlet 66.

As may be appreciated, certain of the devices 14 may be devices that are used to perform welding operations, while other devices 14 may be used by a welding operator, but are not directly part of the welding operation (e.g., non-welding devices). In particular, the remote interface 28, the wire feeder 32, the advanced process feeder 36, the plasma cutter 48, and the AC commutator 60 are used directly to perform welding or cutting operations and are therefore considered welding devices. By connecting any of the devices 14 directly to the welding cable assembly 16, a single cable assembly can be used to power and operate many welding and non-welding devices. As such, an operator may not need to go to the welding power supply 12 to change between welding operations or to operate non-welding devices because all of the devices operate off of the welding cable assembly 16 using weld power.

Figure 2:
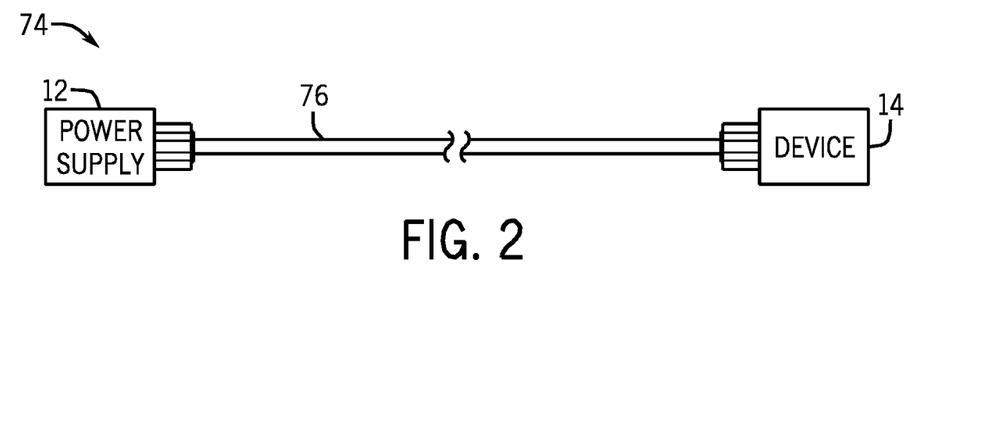
FIG. 2 is a schematic diagram of another embodiment of a welding system employing a similar welding power bus.

FIG. 2 is a schematic diagram 74 illustrating one way that one of the devices 14 may be coupled to the welding power supply 12 via a welding power bus. Specifically, a weld cable 76 connects the welding power supply 12 to the device 14. As may be appreciated, the weld cable 76 may connect to the welding terminals of the welding power supply 12 using a connector, as illustrated. In other embodiments, the weld cable 76 may be attached to the welding terminals in a different manner. Likewise, the weld cable 76 connects to the device 14 using a connector. The weld cable 76 may include one or multiple wires. For example, the weld cable 76 may include only one conductive wire where welding power and communication data flow between the welding power supply 12 and the device 14. In such a configuration, the welding power/data return path may be established by a work cable connected between the welding power supply 12 and a workpiece. The device 14 would also have a return path connection, such as a connection to the workpiece. In another embodiment, the weld cable 76 may include two conductive paths (e.g., a welding power line and a work cable line). Again, in such a configuration, data may be communicated in conjunction with welding power, such as by using WCC. In some embodiments, the weld cable 76 may include separate wires for welding power and for data communication where data communication does not travel with the welding power.

Figure 3:
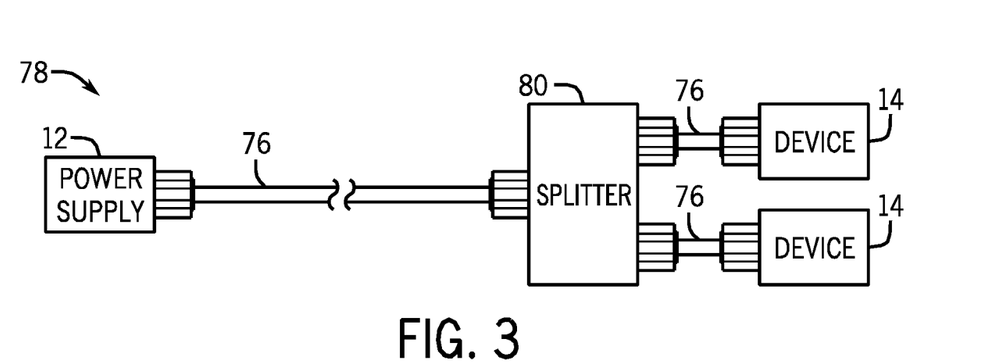
FIG. 3 is a schematic diagram of an embodiment of a welding system employing a similar welding power bus and a splitter.
Figure 4:
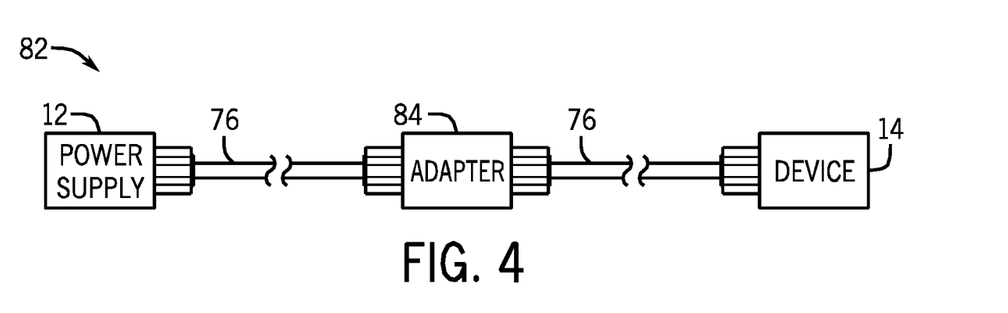
FIG. 4 is a schematic diagram of an embodiment of a welding system employing a similar welding power bus and an adapter.

FIG. 3 is a schematic diagram 78 illustrating one way that multiple devices 14 may be coupled to the welding power supply 12 via a DC welding power bus. As illustrated, a splitter 80 may be used to split welding power and/or data from the welding power supply 12 to the devices 14. FIG. 4 is a schematic diagram 82 illustrating an adapter 84 coupled between the welding power supply 12 and the device 14. In such a configuration, the adapter 84 may convert the welding power from the welding power supply 12 to a voltage and/or current that is useable by the device 14. In other embodiments, the adapter 84 may be used to enable the welding power supply 12 to communicate with the device 14. Further, in certain embodiments, the adapter 84 may be used as a communication interface and to convert welding power for the device 14 to use.

Figure 5:
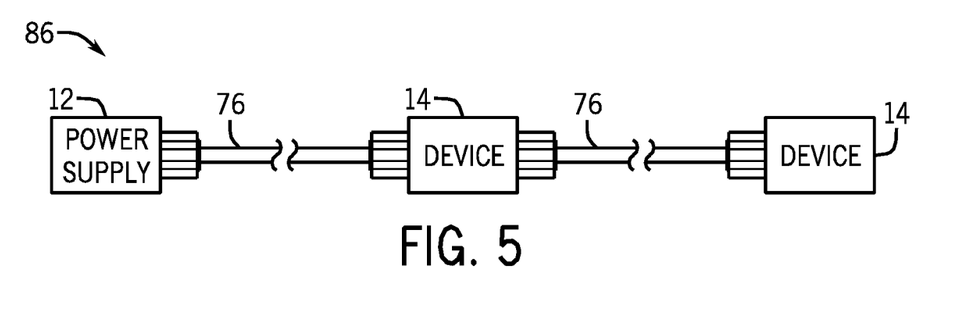
FIG. 5 is a schematic diagram of an embodiment of a welding system employing a similar welding power bus and multiple devices connected together.

FIG. 5 is a schematic diagram 86 illustrating one way to connect multiple devices 14 a daisy chain. One weld cable 76 is coupled between the welding power supply 12 and the first device 14 and another weld cable 76 is coupled between the first device 14 and the second device 14. In such a configuration, the first device 14 may be a flow through device that allows welding power and/or data to flow through the first device 14 to the second device 14. For example, the first device 14 may be the remote interface 28 and the second device 14 may be the advanced process feeder 36. In some embodiments, the first device 14 may act as a converting device for converting power for the second device 14.

Figure 6:
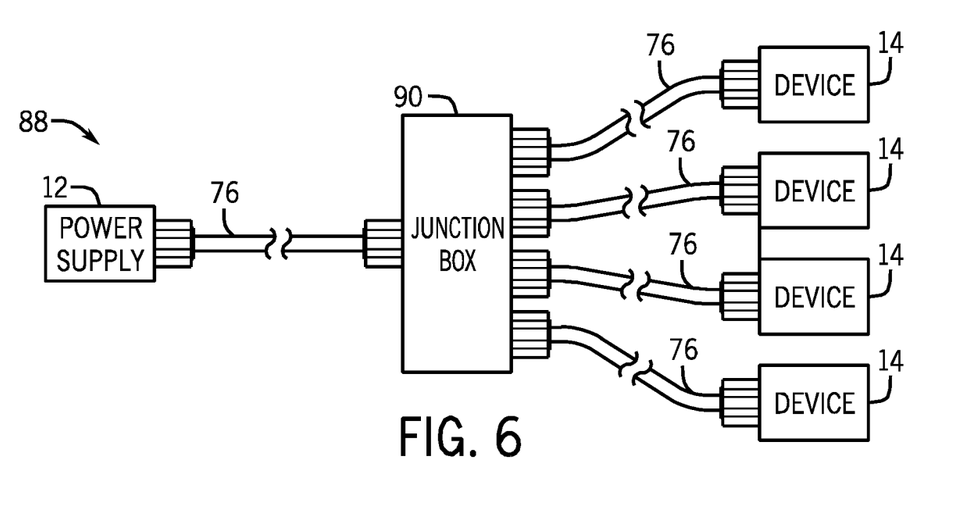
FIG. 6 is a schematic diagram of an embodiment of a welding system employing a similar welding power bus and a junction box with multiple devices connected.

FIG. 6 is a schematic diagram 88 illustrating another way that multiple devices 14 may be coupled to the welding power supply 12 via a welding power bus. As illustrated, a junction box 90 may be used to connect two or more devices 14. One weld cable 76 connects the welding power supply 12 to the junction box 90, while multiple cables 76 connect the devices 14 to the junction box 90. As may be appreciated, when multiple devices 14 are using the same welding power, the power requirements of the devices 14 may make it so that not all devices 14 may be used at the same time. For example, one device may operate using 70 VDC, while another device may operate using 40 VDC. Therefore, these two devices may be incompatible for operating at the same time. Furthermore, devices that operate using the same parameters may be capable of operating at the same time, but the capacity of the welding power supply 12 may be limited to not allow all connected devices to operate concurrently.

As such, the devices 14 may communicate with the welding power supply 12 and/or each other to request the correct settings for the devices 14 and the power supply 12 may establish a priority scheme for powering the devices 14. For example, in certain embodiments, the welding power supply 12 and the devices 14 may communicate using WCC. Such communication may enable all connected devices 14 to communicate with the welding power supply 12 so that the welding power supply 12 knows what devices 14 are connected and what operating parameters the devices 14 utilize.

The welding power supply 12 may communicate with the devices 14 when they are first connected to the weld cable 76. Further, the welding power supply 12 may record the time when the devices 14 are connected. The welding power supply 12 may then use the time that the devices 14 were connected to the welding system to determine which of the devices 14 has the highest priority. For example, the devices 14 that are attached first might have the highest priority. In other embodiments, the devices 14 that are attached last might have the highest priority. Further, in certain embodiments, certain types of devices 14 might have a higher priority than other types of devices 14. For example, the auxiliary power device 64 may have the highest priority, and the degaussing device 56 may have the lowest priority.

For devices that operate using the same parameters, the welding power supply 12 may determine the greatest number of devices 14 that may operate at the same time and provide power to these devices and inhibit power to any other devices. It should be noted that the devices 14 that operate in a multi-device configuration may be configured to receive a command from the welding power supply 12 to turn on or off power to the devices 14. Thus, the welding power supply 12 can control which devices 14 may be operated. In certain configurations, the devices 14 may communicate with each other to determine priority devices 14 and/or turn on and off devices 14.

Figure 7:
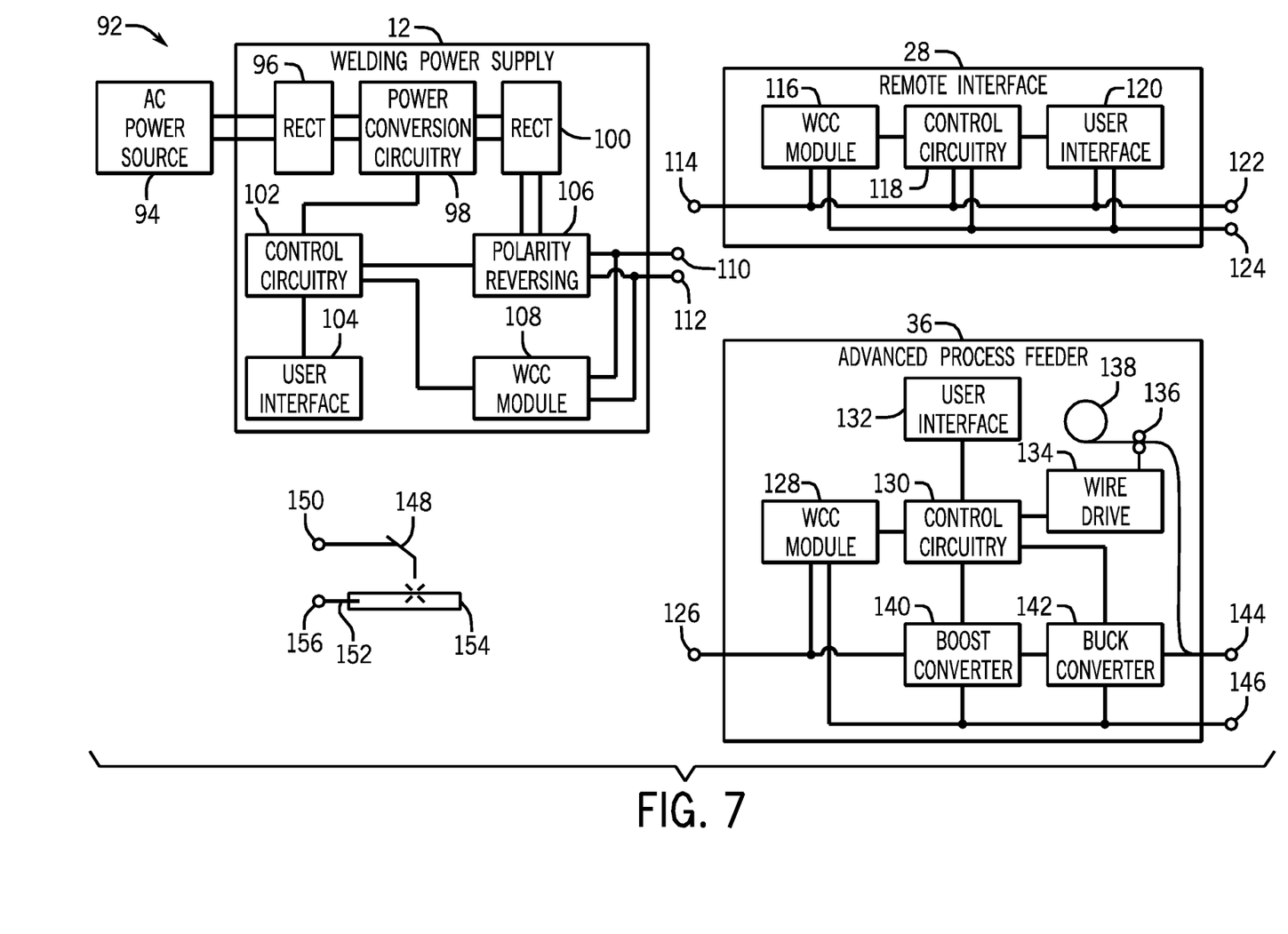
FIG. 7 is a schematic diagram of an embodiment of a welding system using a remote interface and/or an advanced process feeder.

FIG. 7 is a schematic diagram a welding system 92 using the remote interface 28 and/or the advanced process feeder 36. In certain embodiments, the welding power supply 12 receives primary power from an alternating current power source 94 (e.g., the AC power grid, an engine/generator set, or a combination thereof), conditions the input power, and provides an output power to one or more welding devices in accordance with demands of the system 92. The welding power source 12 includes a first rectifier 96, power conversion circuitry 98, and a second rectifier 100. The first rectifier 96 converts the alternating current (AC) from the power source 94 to a direct current (DC) and provides the DC to the power conversion circuitry 98. The power conversion circuitry 98 converts the DC power to voltages that may be used by other components of the welding power supply 12. Furthermore, the power conversion circuitry 98 converts the DC back to AC to allow additional control of the output to other welding devices. Thereafter, the second rectifier 100 converts the AC back to DC.

The power conversion circuitry 98 may include circuit elements such as transformers, switches, boost converters, inverters, and so forth, capable of converting power as dictated by the demands of the system 92. Such circuits are generally known in the art. In some embodiments, the power conversion circuitry 98 may be configured to convert the primary power to both weld and auxiliary power outputs. However, in other embodiments, the power conversion circuitry 98 may be adapted to convert primary power only to a weld power output.

The welding power supply 12 includes control circuitry 102 and a user interface 104. The control circuitry 102 controls the operations of the welding power supply 12 and may receive input from the user interface 104 through which a user may choose a process, manually select which devices 14 are connected to the weld cable so the control circuitry 102 can establish an identity of connected devices 14, and input desired parameters (e.g., voltages, currents, particular pulsed or non-pulsed welding regimes, and so forth). In addition, the control circuitry 102 may adapt the output welding power to be used by a particular device or devices 14 connected to the welding power supply 12, such as based on the particular requirements of the device or devices connected. In certain configurations, the control circuitry 102 may automatically detect and identify devices 14 that are connected to the weld cable based on communication received from the devices 14. The control circuitry 102 may be configured to receive and process a plurality of inputs regarding the performance and demands of the system 92. Furthermore, the control circuitry 102 controls parameters input by the user as well as any other parameters, such as the priority scheme for powering devices 14 connected to the weld cable (e.g., using adapted power). The control circuitry 102 may include volatile or non-volatile memory, such as ROM, RAM, magnetic storage memory, optical storage memory, or a combination thereof. In addition, a variety of control parameters may be stored in the memory along with code configured to provide a specific output (e.g., initiate wire feed, enable gas flow, etc.) during operation.

The control circuitry 102 controls polarity reversing circuitry 106 that is used to reverse the output polarity when needed, such as based on data received from a particular device 14 connected to the welding power supply 12. Further, data is communicated between the control circuitry 102 and a WCC module 108 (i.e., communication module). The WCC module 108 controls data communications between the welding power supply 12 and other devices configured with a WCC module. Power and data are output from the welding power supply 12 to welding power terminals 110 and 112. Generally, terminal 110 is considered positive (+), while terminal 112 is considered negative (−). However, the polarity reversing circuitry 106 may reverse the terminal polarity so that terminal 110 is considered negative (−), while terminal 112 is considered positive (+). As previously discussed, any welding or non-welding device 14 that is properly adapted may be coupled to the terminals 110 and 112 via a weld cable.

The remote interface 28 has an input terminal 114 that generally receives positive (+) input, but may receive a negative (−) input. The remote interface 28 is one of the devices 14 that may operate using power and, in certain configurations, data, from the weld cable. The remote interface 28 is configured to receive and control the welding power for TIG or stick welding. The remote interface 28 has a WCC module 116 so the remote interface 28 can communicate with other devices 14 and the welding power supply 12 using WCC. The WCC module 116 also conditions data for communication with control circuitry 118.

The control circuitry 118 functions similar to control circuitry 102, but controls the functionality of the remote interface 28. The control circuitry 118 may receive input from a user interface 120 through which a user may input desired parameters (e.g., manually enable weld cable power to the remote interface 28, manually select input voltages and currents, and so forth). Furthermore, the user interface 120 may include a display to show information to an operator. Power and data are output from the remote interface 28 to output terminals 122 and 124. Generally, terminal 122 is considered positive (+), while terminal 124 is considered negative (−). However, in embodiments where the input terminal 114 receives a negative (−) input, the terminal polarity is reversed so that terminal 122 is considered negative (−), while terminal 124 is considered positive (+).

The advanced process feeder 36 has an input terminal 126 that receives a positive (+) input. The advanced process feeder 36 is another one of the devices 14 that operates using power and, in certain configurations, data, from the weld cable. The advanced process feeder 36 is configured to receive and control the welding power for MIG welding. The advanced process feeder 36 also includes the functionality of a wire feeder and provides welding wire to a welding operation. Further, the advanced process feeder 36 has a WCC module 128 so the advanced process feeder 36 can communicate with other devices 14 and the welding power supply 12 using WCC. In addition, the WCC module 128 conditions data for communication with the control circuitry 130.

The control circuitry 130 functions similar to control circuitry 102 and 118, but controls the functionality of the advanced process feeder 36. The control circuitry 130 may receive input from a user interface 132 through which a user may input desired parameters (e.g., manually enable weld cable power to the advanced process feeder 36, manually select input voltages and currents, and so forth). Furthermore, the user interface 132 may include a display to show information to an operator. The control circuitry 130 also controls a wire drive 134. The wire drive 134 is used to rotate rollers 136 to provide welding wire from a spool 138 for a MIG welding operation.

The advanced process feeder 36 includes a boost converter 140 and a buck converter 142 to provide power for certain welding operations, such as for RMD™ and pulse welding processes. The boost converter 140 receives DC voltage from the input 126 and steps-up, or increases, the DC voltage to provide power to the buck converter 142. The buck converter 142 receives the stepped-up DC voltage and steps-down, or decreases, the DC voltage to control the flow of weld current. Welding power is output from the buck converter 142 and flows to output terminals 144 and 146. The output terminal 144 is considered positive (+), while the output terminal 146 is considered negative (−). Welding operations are performed using a welding torch 148 with an input 150. The input 150 is generally uses a positive (+) input, but in certain configurations may utilize a negative (−) input. A clamp 152 from a work cable is coupled to a workpiece 154. An input 156 to the clamp is generally a negative (−) input, but in certain configurations may be a positive (+) input.

As illustrated in FIG. 7, the inputs 114, 126, 150, and 156 are not shown connected to an output. Further, the outputs 110, 112, 122, 124, 144, and 146 are not shown connected to an input. This is to demonstrate how the devices 14 (e.g., remote interface 28, advanced process feeder 36) may be interchanged or configured in the system 92. For example, in certain configurations the output 110 of the welding power supply 12 may be coupled to the input 114 of the remote interface 28, such as for stick or TIG welding. Further, the output 122 of the remote interface 28 may be coupled to the input 150 of the torch 148. The output 112 of the welding power supply 12 and the output 124 of the remote interface 28 may both be connected to the input 156 to be coupled to the workpiece 154 and therefore complete a welding circuit. As may be appreciated, in such a configuration the WCC module 116 of the remote interface 28 communicates with the WCC module 108 of the welding power supply 12 so that the welding power supply 12 can identify the settings of the remote interface 28 and provide appropriate power to the remote interface 28.

In certain embodiments, the welding polarity just described may be reversed by the polarity reversing circuitry 106 so that current flows in the opposite direction. In another embodiment, the welding polarity may be reversed by physically reversing the connections used for welding. For example, the output 112 of the welding power supply 12 may be coupled to the input 114 of the remote interface 28 and the output 122 may be coupled to the input 150 of the torch 148. In addition, the output 110 of the welding power supply 12 and the output 124 of the remote interface 28 may both be coupled to the input 156 that connects to the workpiece 154. In such a configuration, the welding polarity is reversed manually.

The advanced process feeder 36 may be used by coupling the output 110 of the welding power supply 12 to the input 126 of the advanced process feeder 36. Further, the output 144 of the advanced process feeder 36 is coupled to the input 150 of the torch 148. The output 112 of the welding power supply 12 and the output 146 of the advanced process feeder 36 are both coupled to the input 156 that is coupled to the workpiece 154. In this configuration, the WCC module 128 of the advanced process feeder 36 communicates with the WCC module 108 of the welding power supply 12 so that the welding power supply 12 can identify the settings of the advanced process feeder 36 and provide appropriate power to the advanced process feeder 36. As may be appreciated, the torch 148 may be any type of torch that is appropriate for the device it is coupled to. For example, while welding with the remote interface 28, the torch 148 may be a TIG torch or stick electrode holder and while welding with the advanced process feeder 36 the torch 148 may be a MIG torch.

In certain embodiments, the remote interface 28 and the advanced process feeder 36 may be coupled together so that the remote interface 28 acts as a flow through device. In such a configuration, the input 114 of the remote interface 28 is coupled to the output 110 of the welding power supply 12. The input 126 of the advanced process feeder 36 is coupled to the output 122 of the remote interface 28 and the input 150 to the torch 148 is coupled to the output 144 of the advanced process feeder 36. Further, the output 112 of the welding power supply 12, the output 124 of the remote interface 28, and the output 146 of the advanced process feeder 36 are all coupled to the input 156 that connects to the workpiece 154. The WCC modules 108, 116, and 128 communicate together to coordinate settings for the welding operation. As may be appreciated, any of the devices 14 illustrated in FIG. 1 may be coupled to the welding power supply 12 to receive power and communication. The devices 14 may be coupled in a similar manner to the manner described for coupling the remote interface 28 and the advanced process feeder 36 to the welding power supply 12. Therefore, power may be supplied directly from the welding power supply 12 to the devices 14 via the weld cable.

Figures 8, 9:
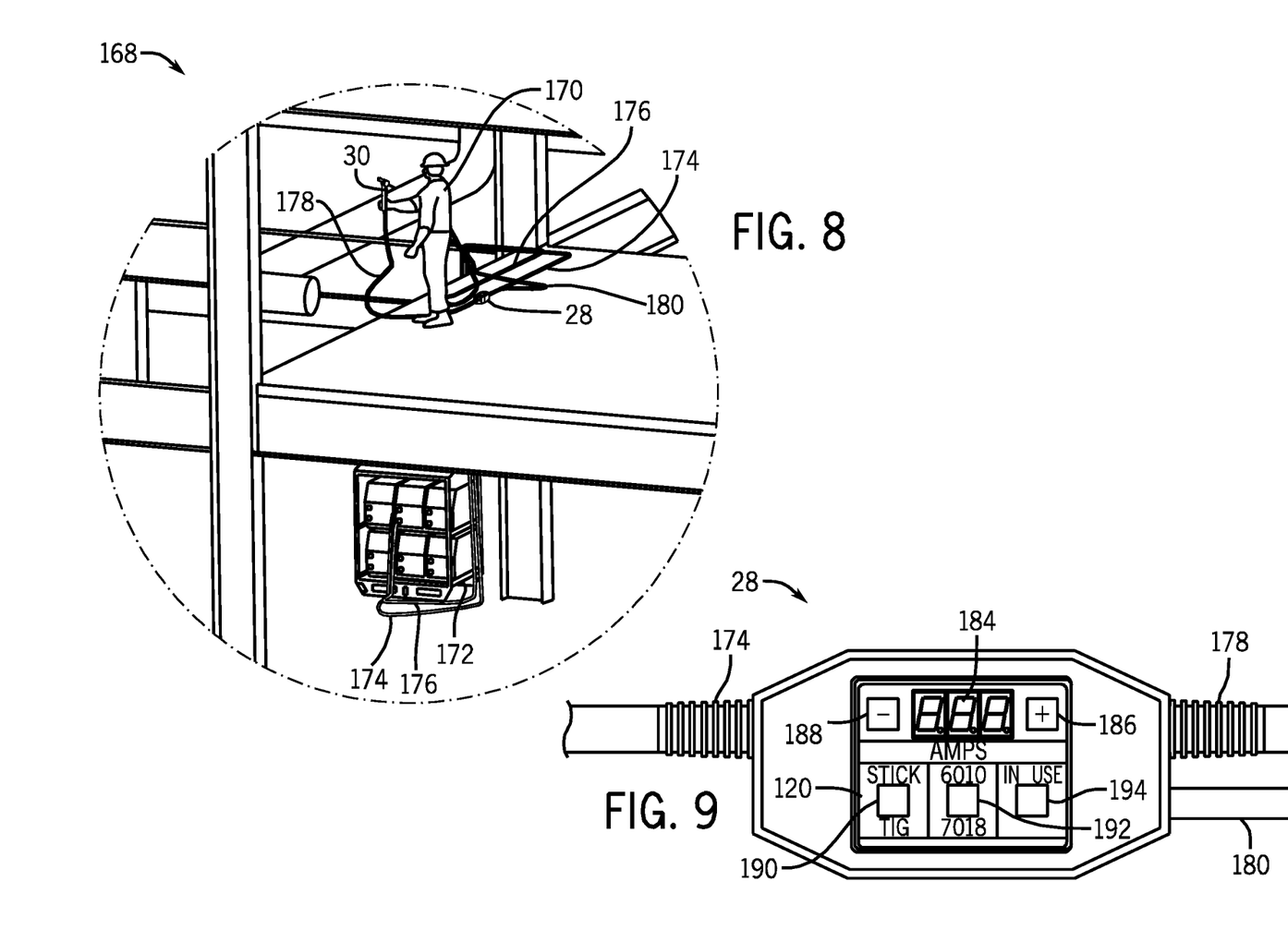
FIG. 8 is a diagrammatical view of an embodiment of a welding system using a remote interface.
FIG. 9 is a diagrammatical view of the remote interface of FIG. 8.

FIG. 8 is a diagrammatical view a welding system 168 using the remote interface 28. An operator 170 is illustrated using the torch 30 to perform a welding operation. A welding power supply 172 provides welding power over a weld cable 174. A work cable 176 couples the welding power supply 172 to a workpiece. The weld cable 174 is coupled to the remote interface 28 and the torch 30 is coupled to the remote interface 28 using a torch cable 178. Further, the remote interface 28 is coupled to the workpiece using a cable 180. As illustrated, the remote interface 28 is located close to the welding operation and allows the operator 170 to adjust or monitor settings without returning to the welding power supply 172.

FIG. 9 is a diagrammatical view of one embodiment of the remote interface 28 of FIG. 8. The remote interface 28 includes a user interface that allows the operator 170 to make selections and view data. The user interface includes a display 184 for displaying values, such as settings or measurements. The user interface also includes buttons and/or indicators 186, 188, 190, 192, and 194. For example, the operator 170 may use the button 186 to increase a welding current or the button 188 to decrease a welding current. The button 190 may be used to alternate between stick and TIG welding. In addition, the button 190 may reverse the polarity of the power from the welding power supply 12. Further, the button 192 may be used to indicate the type of electrode being used for the welding operation. The indicator 194 may illuminate when the torch 30 is in use. As may be appreciated, the user interface of the remote interface 28 may include displays, buttons, and indicators that vary from those illustrated.

Figures 10, 11:
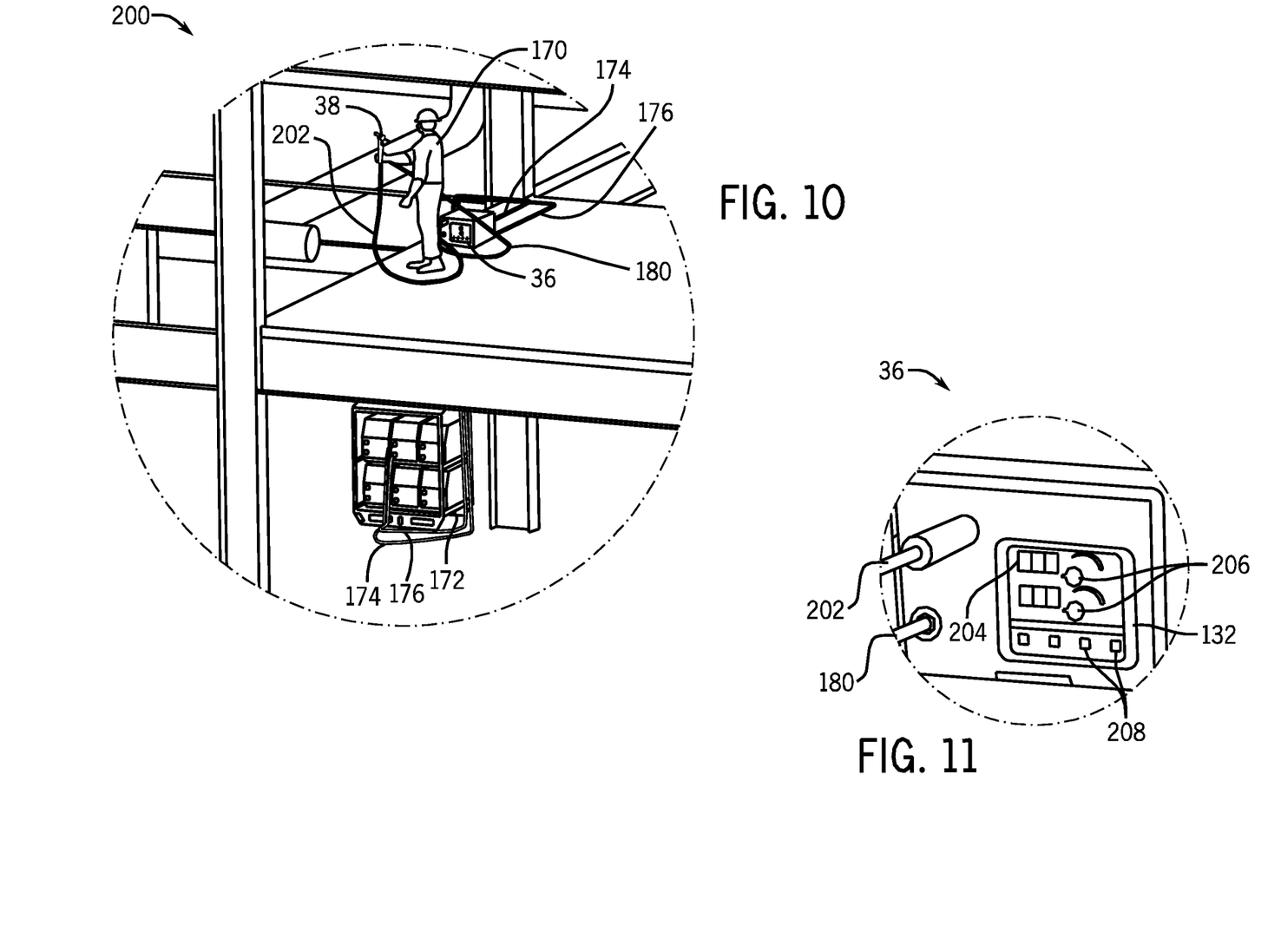
FIG. 10 is a diagrammatical view of an embodiment of a welding system using an advanced process feeder.
FIG. 11 is a diagrammatical view of the advanced process feeder of FIG. 10.

FIG. 10 is a diagrammatical view of a welding system 200 using an advanced process feeder 36. The operator 170 is illustrated using the torch 38 to perform a welding operation. The welding power supply 172 provides welding power over the weld cable 174 and a work cable 176 couples the welding power supply 172 to a workpiece. The weld cable 174 is coupled to the advanced process feeder 36. In another embodiment, the work cable 176 and the weld cable 174 may both directly connect to the advanced process feeder 36. Further, the torch 38 is coupled to the advanced process feeder 36 using a torch cable 202. The advanced process feeder 36 is coupled to the workpiece using the cable 180. As illustrated, the advanced process feeder 36 is located close to the welding operation and allows the operator 170 to adjust or monitor settings without returning to the welding power supply 172.

FIG. 11 is a diagrammatical view of one embodiment of the advanced process feeder 36 of FIG. 10. The advanced process feeder 36 includes a user interface that allows the operator 170 to make selections and view data. The user interface includes a display 204 for displaying values, such as settings or measurements. The user interface also includes knobs, buttons, and/or indicators 206 and 208. For example, the operator 170 may use the knobs 206 to adjust settings.

The buttons and indicators 206 may also be used to adjust setting and may illuminate when selected. As may be appreciated, the user interface of the advanced process feeder 36 may include displays, knobs, buttons, and indicators that vary from those illustrated.

Figure 12:
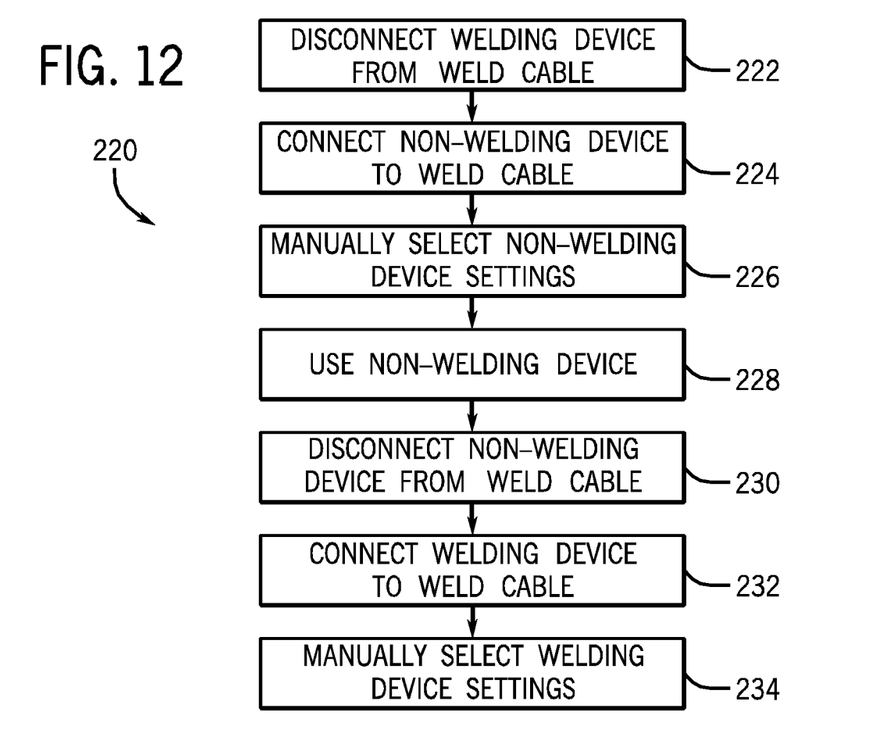
FIG. 12 is a flow chart of an embodiment of a process for manually selecting a connected device.

FIG. 12 is a flow chart of a process 220 for manually selecting a device 14 connected to the welding power supply 12. At step 222, the welding device is disconnected from the weld cable. After the welding device is removed, a non-welding device 14 is connected to the weld cable, per step 224. As previously described, the non-welding device 14 may be a lighting system, an induction heater, a resistance heater, a battery charger, a rod oven, a degaussing device, an auxiliary power device, etc. Next, at step 226, an operator manually selects that a non-welding device is being used and the operator may select the settings for the device. In certain embodiments, the operator may make these selections and/or settings on the device 14, while in other embodiments, the operator may make these selections and/or settings at the welding power supply 12. Then, at step 228, the operator uses the non-welding device 14. When the operator is done using the device 14, the operator disconnects the non-welding device 14 from the weld cable, per step 230. At step 232, the operator connects the welding device to the weld cable. Then, at step 234, the operator manually selects the welding device settings. Again, the operator may make the welding device settings on the welding device, or on the welding power supply 12. The operator may then continue a welding operation. As may be appreciated, the order of the steps may vary from the order in which they are described. For example, the operator may select the non-welding device settings as described in step 226 prior to connecting the non-welding device to the weld cable, as described in step 224.

Figure 13:
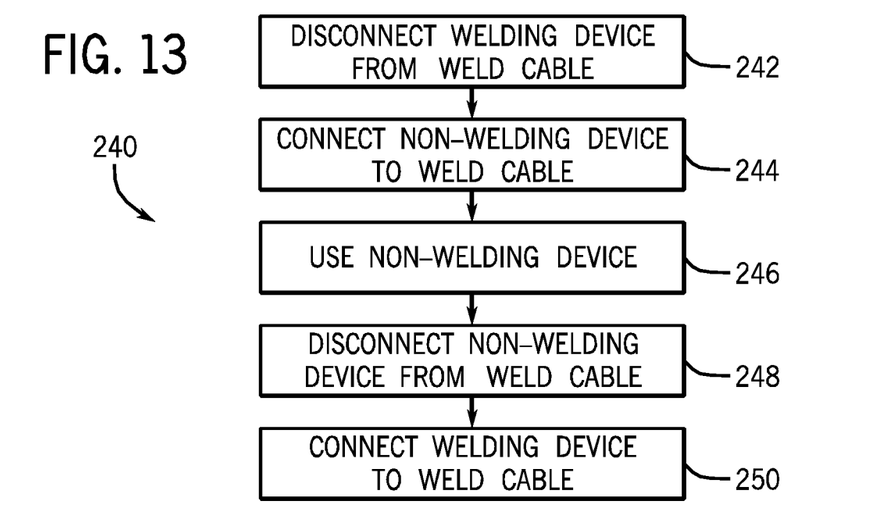
FIG. 13 is a flow chart of an embodiment of a process for automatically selecting a connected device.

FIG. 13 is a flow chart of a process 240 for automatically selecting a device 14 connected to the welding power supply 12. At step 242, the welding device is disconnected from the weld cable. After the welding device is removed, a non-welding device 14 is connected to the weld cable, per step 244. When the non-welding device 14 is connected, the welding power supply 12 communicates with the non-welding device 14, such as to determine the type of device connected and the settings for the device. The welding power supply 12 adapts the weld power flowing through the weld cable to the appropriate settings for the non-welding device 14. Then, at step 246, the operator uses the non-welding device 14. When the operator is done using the device 14, the operator disconnects the non-welding device 14 from the weld cable, per step 248. At step 250, the operator connects the welding device to the weld cable. When the welding device is connected, the welding power supply 12 communicates with the welding device, such as to determine the type of welding device connected and the settings for the device. The welding power supply 12 adapts the weld power flowing through the weld cable to the appropriate settings for the welding device. It should be noted that the welding devices and the non-welding devices 14 may operate at various voltages, currents, etc. As such, the welding power supply 12 may provide a standard voltage to every device 14 when the device is initially connected to the welding power supply 12 until the welding power supply 12 determines that it is appropriate to provide a different voltage to the device.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply configured to provide output power to one of a first device or a second device, the welding power supply comprising:
   power conversion circuitry configured to convert input power to output power;
   welding terminals, comprising a first welding terminal and a second welding terminal, configured to:
      receive the output power from the power conversion circuitry;
      when a first device is electrically connected to the first welding terminal and the second welding terminal, provide the output power via the first welding terminal and the second welding terminal to a first device that does not use the output power for a welding operation;
      when the second device is separately electrically connected to the same first welding terminal and the same second welding terminal, provide the output power via the first welding terminal and the second welding terminal to a second device that uses the output power for the welding operation; and
   control circuitry configured to:
      receive data from the first or second device via the first welding terminal and the second welding terminal to identify the first or second device attached to the first welding terminal and the second welding terminal; and
      adapt the output power to the first or second device based at least in part on an identity of the first or second device electrically connected to the first welding terminal and the second welding terminal.

2. The welding power supply of claim 1, wherein the first welding terminal and the second welding terminal are configured to provide the output power to a plurality of devices that do not use the output power for a welding operation and the control circuitry is configured to receive data relating to the plurality of devices, to determine settings for the devices based on the data received via the first welding terminal and the second welding terminal, and to provide adapted output power to the devices based on the determined settings for the devices, wherein the received data comprises a plurality of identities, and each identity of the plurality of identities corresponds to a respective device of the plurality of devices.

3. The welding power supply of claim 2, wherein the control circuitry is configured to provide adapted output power to the plurality of devices based on a priority scheme.

4. The welding power supply of claim 2, wherein the plurality of devices comprise at least two of a direct current based lighting system, an induction heater, a resistance heater, a battery charger, a rod oven, a degaussing device, and an auxiliary power output.

5. The welding power supply of claim 2, comprising a communication module configured to receive the data from the devices, the data being received over a weld cable and through the first welding terminal and the second welding terminal.

6. The welding power supply of claim 1, comprising polarity reversing circuitry configured to reverse a polarity of the output power supplied to the first welding terminal and the second welding terminal based on the data received from the first and second device.

7. The welding power supply of claim 1, comprising a user interface coupled to the control circuitry, wherein the control circuitry is configured to identify the first and second device based on a manual selection via the user interface.

8. The welding power supply of claim 1, wherein the control circuitry is configured to identify the first and second device automatically based on respective communication with the first and second device.

9. The welding power supply of claim 1, wherein the control circuitry is configured to identify the first and second device automatically based on respective communication with the first and second device via the first welding terminal and the second welding terminal.

10. The welding power supply of claim 1, wherein the control circuitry is configured to determine the second device to be an advanced process feeder based on the data, and adapt the output power to the advanced process feeder.

11. The welding power supply of claim 1, wherein the control circuitry is configured to determine the second device to be an induction heating device based on the data, and adapt the output power to the induction heating device.

12. The welding power supply of claim 1, wherein the control circuitry is configured to determine at least one of a type of the first or second device or a setting of the first or second device based on the received data.

13. A welding system comprising:
a welding torch configured to receive output power from a welding power supply, the welding torch configured to receive the output power from a first welding terminal and a second welding terminal of the welding power supply; and
a non-welding device configured to receive adapted output power from the same first welding terminal and the same second welding terminal of the welding power supply;
wherein the welding power supply is configured to determine a type of device coupled to the first welding terminal and the second welding terminal of the welding power supply based on data communication with the non-welding device via the first welding terminal and the second welding terminal, wherein the welding power supply is configured to adapt the output power to the adapted output power to power the non-welding device when the type of device is determined to be the non-welding device, and the welding power supply is configured to provide the output power to the welding torch when the type of device is determined to be the welding torch.

14. The welding system of claim 13, wherein the welding power supply is configured to have the welding torch receive the output power from the first welding terminal and the second welding terminal, or to have the non-welding device receive the adapted output power from the first welding terminal and the second welding terminal in lieu of the welding torch.

15. The welding system of claim 13, wherein the welding power supply is configured to have the welding torch receive the output power from the first welding terminal and the second welding terminal while the non-welding device receives the adapted output power from the first welding terminal and the second welding terminal.

16. The welding system of claim 13, wherein the welding torch receives the output power through a wire feeder.

17. The welding system of claim 13, comprising a plurality of types of non-welding devices, each configured to receive adapted output power from the first welding terminal and the second welding terminal of the welding power supply, wherein each of the plurality of types of non-welding devices receive adapted output power from the welding power supply based on a priority scheme, and the priority scheme is based on the plurality of types of non-welding devices.

* * * * *